(12) United States Patent
Morishita (10) Patent No.: US 12,489,168 B2
(45) Date of Patent: Dec. 2, 2025

(54) BATTERY MODULE (71) Applicant: SANYO Electric Co., Ltd., Osaka (JP)

(72) Inventor: Taijyu Morishita, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 503 days.

(21) Appl. No.: 17/906,479

(22) PCT Filed: Jan. 20, 2021

(86) PCT No.: PCT/JP2021/001783
§ 371 (c)(1),
(2) Date: Sep. 16, 2022

(87) PCT Pub. No.: WO2021/199591
PCT Pub. Date: Oct. 7, 2021

(65) Prior Publication Data
US 2023/0135184 A1 May 4, 2023

(30) Foreign Application Priority Data
Mar. 31, 2020 (JP) .................................. 2020-064242

(51) Int. Cl.
*H01M 50/291* (2021.01)
*H01M 10/613* (2014.01)
*H01M 10/6561* (2014.01)
*H01M 50/209* (2021.01)

(52) U.S. Cl.
CPC ....... *H01M 50/291* (2021.01); *H01M 10/613* (2015.04); *H01M 10/6561* (2015.04); *H01M 50/209* (2021.01)

(58) Field of Classification Search
CPC ............. H01M 50/291; H01M 50/209; H01M 10/613; H01M 10/6561
See application file for complete search history.

(56) References Cited

U.S. PATENT DOCUMENTS

| | | |
|---|---|---|
| 10,347,881 B2 | 7/2019 | Han |
| 2016/0308186 A1 | 10/2016 | Han |
| 2018/0019454 A1 | 1/2018 | Okada et al. |
| 2018/0138560 A1 | 5/2018 | Bessho |

(Continued)

FOREIGN PATENT DOCUMENTS

| | | |
|---|---|---|
| JP | 2009-081056 A | 4/2009 |
| JP | 2014-157747 | 8/2014 |
| JP | 2015-230764 | 12/2015 |

(Continued)

OTHER PUBLICATIONS

JP2009081056A. Apr. 16, 2009. English machine translation by EPO. (Year: 2009).*

(Continued)

*Primary Examiner* — James Lee
(74) *Attorney, Agent, or Firm* — WHDA, LLP (57) ABSTRACT

Battery module includes: battery stack in which a plurality of batteries are stacked; end plate provided outside battery at an end in a stacking direction of the plurality of batteries; and end separator provided between battery at the end and end plate, the end separator being disposed in a part in the stacking direction and including deformation allowing part in which deformation due to creep is larger than deformation of other parts.

3 Claims, 6 Drawing Sheets

(56) References Cited

U.S. PATENT DOCUMENTS

2020/0259134 A1    8/2020    Yaginuma et al.
2021/0135317 A1    5/2021    Oka et al.

FOREIGN PATENT DOCUMENTS

| JP | 2020-043005 A | 3/2020 |
|---|---|---|
| WO | 2013/161655 | 10/2013 |
| WO | 2016/157267 | 10/2016 |
| WO | 2017/017914 | 2/2017 |
| WO | 2019/058902 A1 | 3/2019 |
| WO | 2019/142645 | 7/2019 |
| WO | 2020/059299 A1 | 3/2020 |

OTHER PUBLICATIONS

English Translation of Chinese Search Report dated Nov. 28, 2023, issued in counterpart CN Patent Application No. 202180008363.8. (3 pages).
International Search Report of PCT application No. PCT/JP2021/001783 dated Apr. 6, 2021.
Extended (Supplementary) European Search Report dated Mar. 20, 2024, issued in counterpart EP Application No. 21780088.7. (9 pages).
English Translation of Search Report dated Jul. 20, 2024 issued in counterpart CN Application No. 202180008363.8. (3 pages).
Office Action dated Oct. 16, 2025, issued in counterpart IN Application No. 202247060957.(6 pages).

\* cited by examiner

BATTERY MODULE

CROSS-REFERENCE TO RELATED APPLICATIONS

This application is a U.S. national stage application of the PCT International Application No. PCT/JP2021/001783 filed on Jan. 20, 2021, which claims the benefit of foreign priority of Japanese patent application No. 2020-064242 filed on Mar. 31, 2020, the contents all of which are incorporated herein by reference.

TECHNICAL FIELD

The present invention relates to a battery module.

BACKGROUND ART

For example, as a power source for a vehicle or the like that requires a high output voltage, there has been known a battery module formed by electrically connecting a plurality of batteries to each other. In general, in each battery constituting a battery module, an internal electrode body, an electrolyte, and the like degrade over time, and bulge due to deposition or oxidation of a metal material, and a change appears in an outer shape. Regarding a battery module including such a battery, PTL 1 discloses a battery module including a battery stack in which a plurality of batteries are stacked and an insulating sheet is interposed between the batteries, and end plates provided at both ends in the stacking direction of the battery stack.

CITATION LIST

Patent Literature

PTL 1: WO 2013/161655 A

SUMMARY OF THE INVENTION

When the dimension of each battery in the battery module in the stacking direction increases with aging, a load due to a dimensional variation of all the batteries is applied to the end plates at both ends of the battery stack, and a reaction force thereof is applied to each battery, which may cause a failure such as breakage of the battery.

The present invention has been made in view of such circumstances, and an object of the present invention is to provide a technique for reducing a reaction force generated in a stacking direction in a battery module.

A battery module according to an aspect of the present invention includes: a battery stack in which a plurality of batteries are stacked; an end plate provided outside a battery at an end in a stacking direction of the plurality of batteries; and an end separator provided between the battery at the end and the end plate, the end separator being disposed in a part in the stacking direction and including a deformation allowing part in which deformation due to creep is larger than deformation of other parts.

According to the present invention, the safety of a battery module can be enhanced.

DESCRIPTION OF EMBODIMENT

Hereinafter, the present invention will be described based on a preferred exemplary embodiment with reference to the drawings. The exemplary embodiment is not intended to limit the invention but is an example, and all features described in the exemplary embodiment and combinations thereof are not necessarily essential to the invention. The same or equivalent constituent elements, members, and processing illustrated in the drawings are denoted by the same reference numerals, and a redundant description will be omitted as appropriate. The scale and the shape of each part illustrated in each figure are set for the sake of convenience in order to facilitate the understanding of the description and should not be interpreted in a limited manner unless otherwise specified. In cases where terms such as "first" and "second" are used in the present description or claims, these terms do not represent any order or importance but are intended to distinguish one configuration from another configuration, unless otherwise specified. From each of the drawings, some of members not important for describing the exemplary embodiments are omitted.

Exemplary Embodiment

Figure 1:
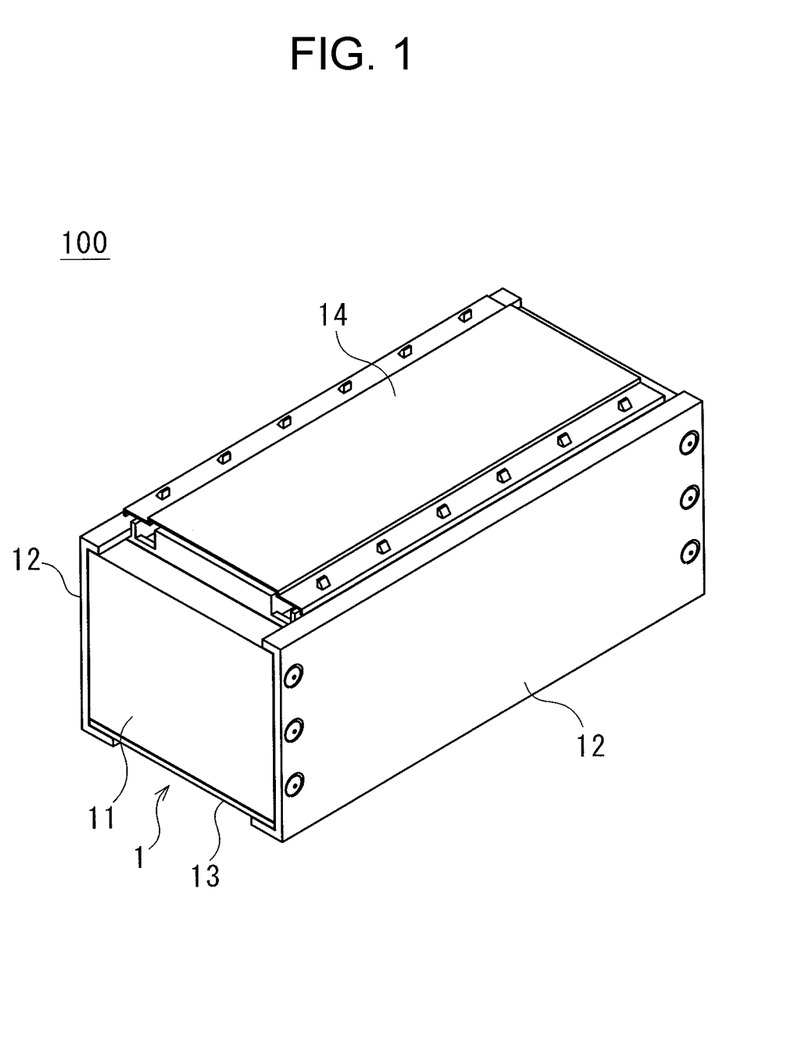
FIG. 1 is a perspective view illustrating an appearance of a battery module according to an exemplary embodiment.
Figure 2:
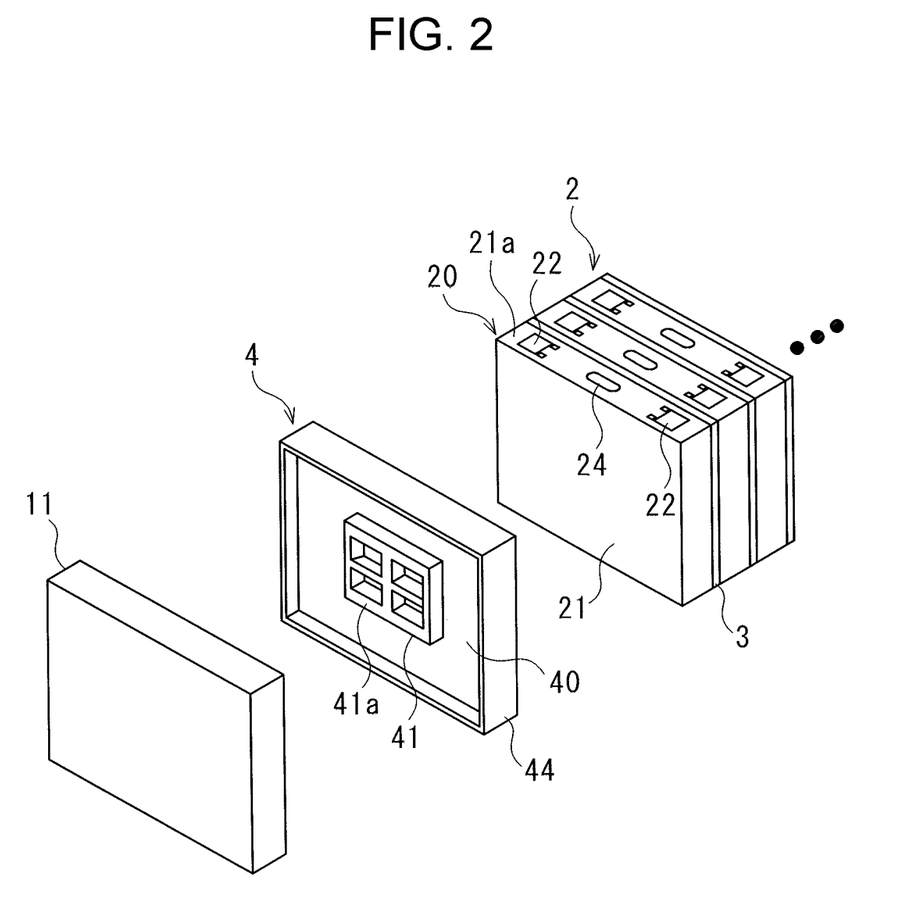
FIG. 2 is an exploded perspective view of a part of the battery module.

FIG. 1 is a perspective view illustrating an appearance of battery module 100 according to an exemplary embodiment, and FIG. 2 is an exploded perspective view of a part of battery module 100. Battery module 100 includes housing 1 having a rectangular-parallelepiped shape, battery stack 2, separator 3, and end separator 4. In battery module 100, end separator 4 is provided with a deformation allowing part in which the deformation due to the creep in the stacking direction is larger than the other parts, and the reaction force acting on the battery due to the creep of the deformation allowing part is reduced.

Housing 1 includes end plate 11, side plate 12, base plate 13, and cover plate 14. End plates 11 are provided outside batteries 20 positioned at both ends of battery stack 2 in the stacking direction of batteries 20. Side plate 12 sandwiches end plate 11 and covers a side surface of battery stack 2. Base plate 13 is configured by covering a bottom of battery stack 2. Cover plate 14 covers an upper surface of battery stack 2.

Battery stack 2 is housed inside housing 1. Battery stack 2 is formed by stacking a plurality of batteries 20 in one direction. Separator 3 formed of a resin material or the like in a sheet shape or a plate shape is provided between the batteries. Separator 3 electrically insulates each battery 20 of battery stack 2. Separator 3 may be considered to constitute a part of battery stack 2 because separator 3 is incorporated into and integrated with battery stack 2.

Each battery 20 is a rechargeable secondary battery such as a lithium-ion battery, a nickel-metal-hydride battery, or a nickel-cadmium battery. Additionally, each battery 20 is a so-called prismatic battery, and has outer covering can 21 having a flat rectangular-parallelepiped shape. One surface of outer covering can 21 is provided with an opening having a substantially rectangular shape not illustrated, and an electrode body, an electrolyte, and the like are accommodated in outer covering can 21 through the opening. Sealing plate 21a that closes the opening of outer covering can 21 is disposed in the opening.

Output terminal 22 of a positive electrode is disposed on sealing plate 21a at a position close to one end of sealing plate 21a in a longitudinal direction, and output terminal 22 of a negative electrode is disposed on sealing plate 21a at a position close to the other end of sealing plate 21a in the longitudinal direction. The pair of output terminals 22 is electrically connected to the corresponding one of a positive electrode plate and a negative electrode plate, constituting the electrode assembly. Respective output terminals 22 are inserted into through-holes (not illustrated) formed in sealing plate 21a. A seal member (not illustrated) having an insulating property is interposed between respective output terminals 22 and respective through-holes. In the following description, for convenience, sealing plate 21a is an upper surface of battery 20, and a bottom surface of outer covering can 21 facing sealing plate 21a is a lower surface of battery 20.

Battery 20 has two main surfaces that connect the upper surface and the lower surface of battery 20 to each other. The main surfaces are surfaces having the largest area out of the six surfaces of battery 20. The main surfaces are long side surfaces connected to the long sides of the upper surface and the long sides of the lower surface. Two remaining surfaces except for the upper surface, the lower surface, and the two main surfaces are referred to as the side surfaces of battery 20. These side surfaces are a pair of short side surfaces connected to the short sides of the upper surface and the short sides of the lower surface. These directions and positions are defined for the sake of convenience. Therefore, for example, the part defined as the upper surface in the present invention does not necessarily mean a part located above the part defined as the lower surface.

Valve 24 is disposed on sealing plate 21a between the pair of output terminals 22. Valve 24 is also referred to as a safety valve. Valve 24 is a mechanism for releasing a gas in each battery 20. Valve 24 is configured to release an internal gas by opening valve 24 when an internal pressure of outer covering can 21 is increased to a predetermined value or more. For example, valve 24 includes: a thin part that is formed on a part of sealing plate 21a and is thinner than other parts of valve 24; and a linear groove formed on a surface of the thin part. In this configuration, when an internal pressure of outer covering can 21 increases, valve 24 is opened by tearing the thin wall part with the groove as a tearing starting point.

The plurality of batteries 20 are stacked at predetermined intervals with the main surfaces of adjacent batteries 20 facing each other. Note that the term "stack" means that a plurality of members are arranged in any one direction. Thus, stacking batteries 20 also includes arranging the plurality of batteries 20 horizontally. In the present exemplary embodiment, batteries 20 are stacked horizontally. Each battery 20 is disposed such that output terminals 22 are directed in the same direction. In the present exemplary embodiment, each battery 20 is disposed such that output terminals 22 are directed upward in the vertical direction.

Figure 3:
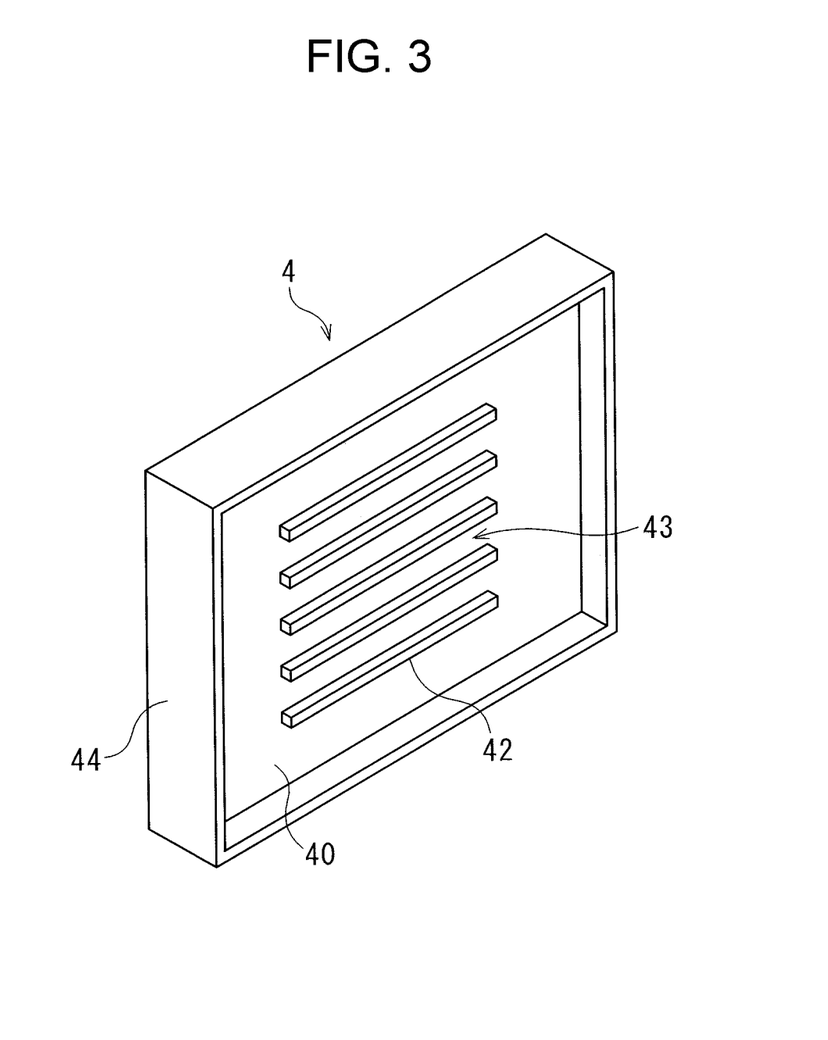
FIG. 3 is a perspective view of an end separator as viewed from a battery side.
Figure 4:
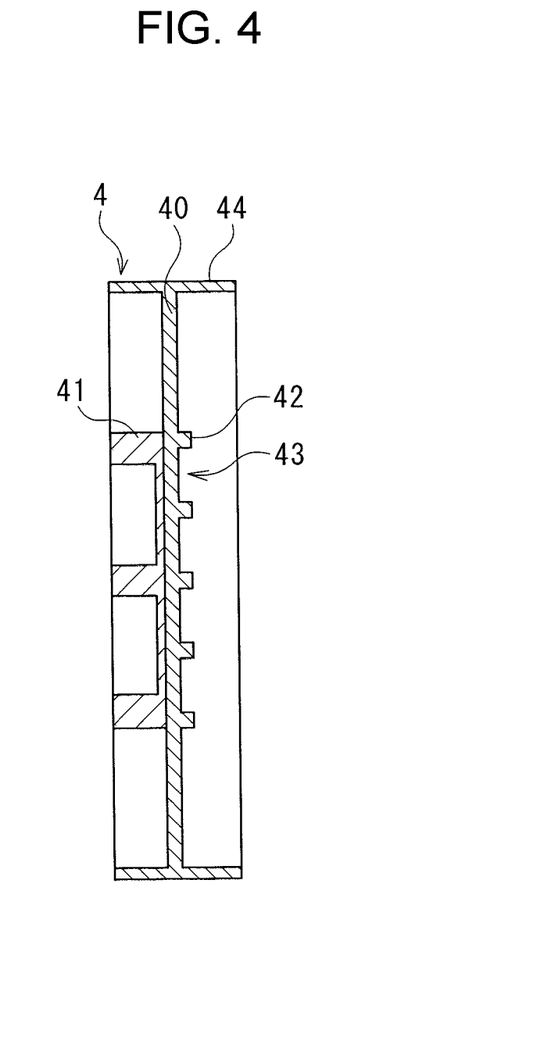
FIG. 4 is a cross-sectional side view of the end separator.

End separator 4 is provided between batteries 20 positioned at an end of battery stack 2 in the stacking direction of batteries 20 and end plate 11. FIG. 3 is a perspective view of end separator 4 as viewed from battery 20 side, and FIG. 4 is a cross-sectional side view of end separator 4. FIG. 4 corresponds to a cross section including a stacking direction and a vertical direction of batteries.

End separator 4 includes substrate 40 intersecting with the stacking direction of batteries 20, deformation allowing part 41, and air passage forming part 42. Deformation allowing part 41 is a part of end separator 4 in the stacking direction of batteries 20, and is formed of a resin material having larger deformation due to creep than other parts. Substrate 40 and air passage forming part 42 are made of a resin material having smaller deformation due to creep than deformation allowing part 41.

Deformation allowing part 41 is formed in a trapezoidal shape so as to rise in the stacking direction from the central part of the surface of substrate 40 near end plate 11, and end surface 41a comes into contact with end plate 11. Air passage forming part 42 is formed of a plurality of strips protruding from the surface of substrate 40 near battery 20, and air passage 43 is formed between the strips.

End separator 4 is in contact with end plate 11 at end surface 41a of the deformation allowing part 41, and is in contact with battery 20 at end surface 42a of air passage forming part 42. Battery 20 is fitted into wall 44 provided on a side part of substrate 40 and surrounding substrate 40. Deformation allowing part 41 has large creep deformation as described above, and is formed of a material different from substrate 40 and air passage forming part 42. Deformation allowing part 41 may be formed separately from substrate 40 and fixed to substrate 40 by adhesion or the like, or may be fixed to substrate 40 by integral molding with substrate 40 and air passage forming part 42.

Figure 5:
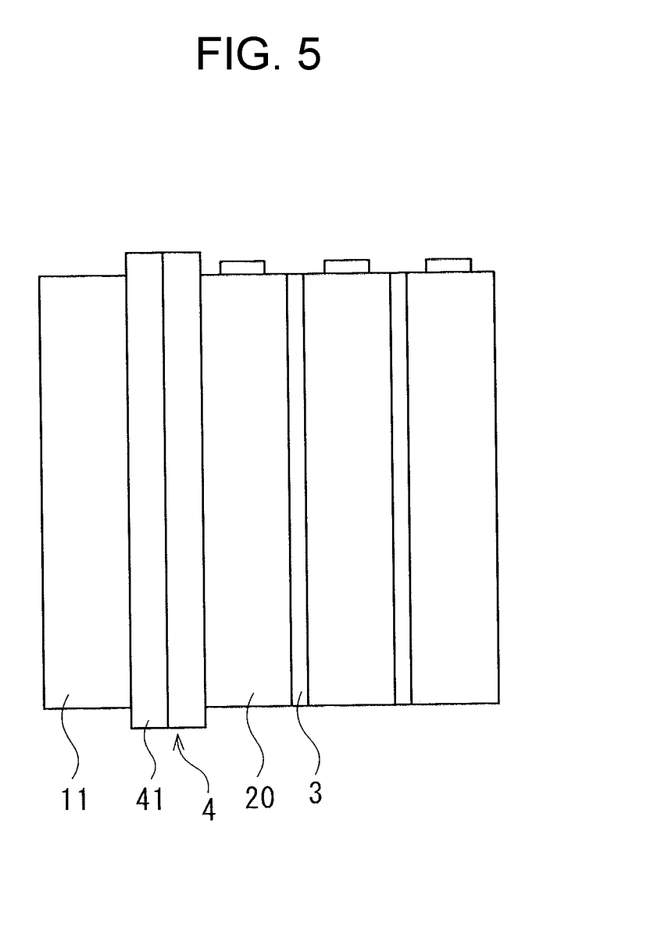
FIG. 5 is a schematic diagram for explaining a positional relationship in a battery module at an initial stage.

Next, the operation of battery module 100 will be described based on the generation of the reaction force due to the expansion of battery 20. FIG. 5 is a schematic diagram for explaining a positional relationship in battery module 100 at an initial stage. FIG. 5 corresponds to a cross section including a stacking direction and a vertical direction of batteries. Each battery 20 does not expand at an initial stage after manufacturing, and a reaction force acting on each battery 20 in the stacking direction is small and is within a designed allowable value.

Figure 6:
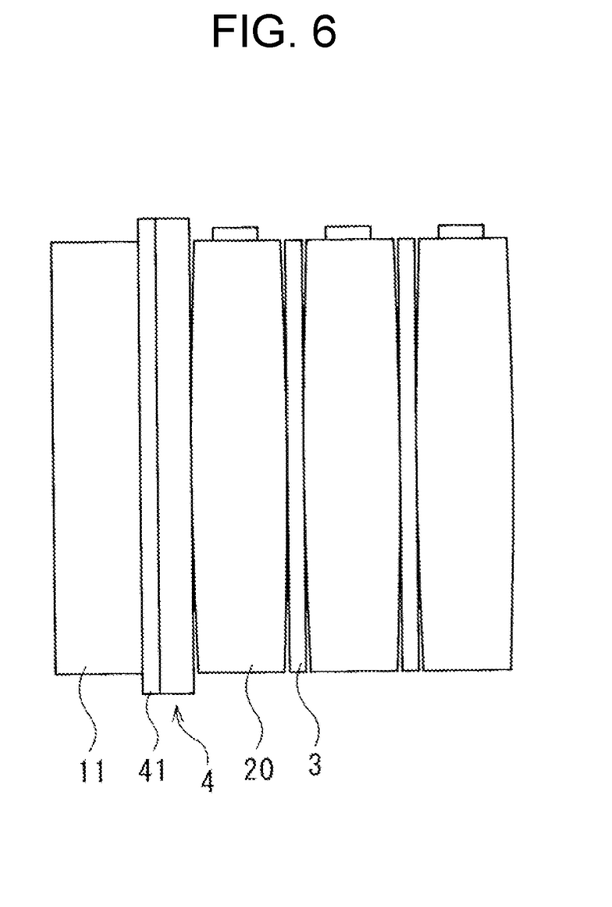
FIG. 6 is a schematic diagram for explaining a state in which a battery in a battery module bulges in a stacking direction due to aged degradation.

FIG. 6 is a schematic diagram for explaining a state in which batteries 20 in battery module 100 bulge in the stacking direction due to aging degradation. FIG. 6 corresponds to a cross section including a stacking direction and a vertical direction of batteries. As described above, in each battery 20, an internal electrode body, an electrolyte, and the like degrade over time, and bulge due to deposition or oxidation of a metal material, and a change appears in an outer shape. Each battery 20 is a prismatic battery and includes the outer covering can 21 having a flat rectangular-parallelepiped shape, and among the six surfaces of battery 20, the main surface having the largest area is deformed so as to expand.

The deformation in the stacking direction caused by the expansion of each battery 20 in battery module 100 is absorbed when the dimension of deformation allowing part 41 of end separator 4 in the stacking direction decreases due to the creep deformation. Therefore, battery module 100 can reduce the reaction force generated in the stacking direction.

Deformation allowing part 41 is provided so as to be in contact with end plate 11, and can uniformly receive a load from end plate 11 formed of a highly rigid material such as metal on end surface 41a as a contact surface.

Deformation allowing part 41 does not need to be in contact with the entire opposing surface of end plate 11, and is formed in a trapezoidal shape so as to rise in the stacking direction from the central part of the surface near substrate 40 on end plate 11, so that the contact area can be reduced and the generated stress can be increased.

End separator 4 includes air passage forming part 42 on the side in contact with battery 20, so that air passage 43 for air cooling of battery 20 can be secured. Since air passage forming part 42 is formed of a material having a smaller creep deformation than deformation allowing part 41, it is possible to suppress a decrease in the flow passage area of air passage 43.

Deformation allowing part 41 is integrally formed with substrate 40 and air passage forming part 42 by a manufacturing method such as two-color molding, so that the manufacturing cost can be reduced.

In the above-described exemplary embodiment, deformation allowing part 41 is provided near end plate 11, but deformation allowing part 41 may be provided near battery 20. Even in this configuration, deformation allowing part 41 receives a load due to the expansion of battery 20 and is creep-deformed, whereby the reaction force generated in the stacking direction in battery module 100 can be reduced.

The present invention has been described based on the exemplary embodiment of the present invention. As a person skilled in the art understands, the exemplary embodiment is exemplified, and the exemplary embodiment is variously varied and modified within a scope of claims of the present invention. Further, such variations and modified examples fall within the scope of the claims of the present invention. Therefore, it should be understood that the description and the drawings herein are not limitative, but are illustrative.

The exemplary embodiment may be defined by the following items.

[Item 1]

Battery module (100) including: battery stack (2) in which a plurality of batteries (20) are stacked; end plate (11) provided outside battery (20) at an end in a stacking direction of the plurality of batteries (20); and end separator (4) provided between battery (20) at the end and end plate (11), the end separator (4) being disposed in a part in the stacking direction and including deformation allowing part (41) in which deformation due to creep is larger than deformation of other parts. Thus, battery module (100) can reduce the reaction force generated in the stacking direction.

[Item 2]

Battery module (100) according to Item 1, in which deformation allowing part (41) is disposed in a part of the end separator (4) in contact with end plate (11). Consequently, deformation allowing part (41) of battery module (100) can uniformly receive a load from end plate (11) made of a highly rigid material such as metal on the contact surface.

[Item 3]

Battery module (100) according to Item 1 or 2, in which deformation allowing part (41) is disposed to rise in a trapezoidal shape from a surface intersecting the stacking direction. As a result, deformation allowing part (41) of battery module (100) can reduce the contact area with end plate (11) and increase the generated stress.

[Item 4]

Battery module (100) according to any one of Items 1 to 3, in which air passage (43) is disposed between battery (20) at the end and end separator (4). Thus, battery module (100) can secure air passage (43) for air cooling of battery (20).

[Item 5]

Battery module (100) according to any one of Items 1 to 4, in which deformation allowing part (41) and other parts are integrally disposed in end separator (4). Thus, the manufacturing cost of battery module (100) can be reduced.

REFERENCE MARKS IN THE DRAWINGS 11 end plate
2 battery stack
20 battery
4 end separator
41 deformation allowing part
43 air passage
100 battery module

The invention claimed is:

1. A battery module comprising:
a battery stack including a plurality of batteries stacked;
an end plate provided outside a battery at an end in a stacking direction among the plurality of batteries; and
an end separator provided between the battery at the end and the end plate, wherein the end separator intersects with the stacking direction and includes a substrate, a deformation allowing part and an air passage forming part,
the substrate including a first surface and a second surface, the first surface being directed toward the end plate, and the second surface being opposite from the first surface;
the deformation allowing part, being disposed on the first surface, and the deformation allowing part is formed of a material including a larger deformation due to creep than deformation due to creep of the substrate and the air passage forming part; and
the air passage forming part is disposed on the second surface,
wherein the deformation allowing part extends from the first surface to the end plate, and contacts the end plate,
wherein the air passage forming part forms an air passage between the battery at the end and the substrate.

2. The battery module according to claim 1, wherein the end separator includes a wall surrounding an entire outer peripheral portion of the substrate, wherein the battery at the end is fitted into the wall.

3. The battery module according to claim 1, wherein the air passage forming part includes a plurality of strips protruding from the second surface and a gap is presented between two adjacent ones of the plurality of strips.

* * * * *